United States Patent
Choi et al.

(10) Patent No.: US 8,014,266 B2
(45) Date of Patent: Sep. 6, 2011

(54) APPARATUS AND METHOD FOR SYNCHRONIZATION ACQUISITION AND CELL ID SEARCH IN WIRELESS COMMUNICATION SYSTEM

(75) Inventors: Seung-Hoon Choi, Suwon-si (KR); June Moon, Seoul (KR); Sung-Eun Park, Seoul (KR); Chi-Woo Lim, Suwon-si (KR); Song-Nam Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 12/460,636

(22) Filed: Jul. 22, 2009

(65) Prior Publication Data

US 2010/0020674 A1    Jan. 28, 2010

(30) Foreign Application Priority Data

Jul. 25, 2008   (KR) .................... 10-2008-0072731

(51) Int. Cl.
*H04W 4/00* (2009.01)
*H04J 3/06* (2006.01)
*H04J 11/00* (2006.01)

(52) U.S. Cl. ......... 370/206; 370/210; 370/330; 370/310

(58) Field of Classification Search .................. None
See application file for complete search history.

(56) References Cited

U.S. PATENT DOCUMENTS

| | | | | |
|---|---|---|---|---|
| 6,909,760 B2* | 6/2005 | Borowski et al. | ............ | 375/367 |
| 7,406,104 B2* | 7/2008 | Yang et al. | .................... | 370/509 |
| 7,532,674 B2* | 5/2009 | Suzuki | ........................ | 375/260 |
| 7,706,249 B2* | 4/2010 | Akita et al. | .................. | 370/208 |
| 2005/0259759 A1* | 11/2005 | Suzuki | ........................ | 375/260 |
| 2006/0154624 A1* | 7/2006 | Suzuki | ........................ | 455/118 |
| 2007/0183306 A1* | 8/2007 | Akita et al. | .................. | 370/208 |
| 2008/0317184 A1* | 12/2008 | Zhang et al. | .................. | 375/367 |

* cited by examiner

*Primary Examiner* — Chi H Pham
*Assistant Examiner* — Soon-Dong D Hyun (57) ABSTRACT

A apparatus and method for allocating synchronization acquisition sequence in a time domain and allocating a cell ID search sequence in a frequency domain. In a method for transmitting a synchronization signal of a base station in a wireless communication system, a binary frequency-domain preamble sequence predetermined for cell ID search and a binary time-domain preamble sequence predetermined for synchronization acquisition are used to determine a complex time-domain preamble sequence except the binary time-domain preamble sequence among the time-domain preamble sequences that are generated according to an Inverse Fast Fourier Transform (IFFT) operation on the binary frequency-domain preamble sequence. The complex time-domain preamble sequence and the binary time-domain preamble sequence are transmitted to a mobile station.

20 Claims, 5 Drawing Sheets

$$D = \frac{1}{\sqrt{N}} \begin{bmatrix} 1 & 1 & 1 & \cdots & 1 & 1 & 1 & 1 & \cdots & 1 \\ 1 & \omega & \omega^2 & \cdots & \omega^{K-1} & \omega^K & \omega^{K+1} & \omega^{K+2} & \cdots & \omega^{N-1} \\ 1 & \omega^2 & \omega^4 & \cdots & \omega^{2(K-1)} & \omega^{2K} & \omega^{2(K+1)} & \omega^{2(K+2)} & \cdots & \omega^{2(N-1)} \\ \vdots & \vdots & \vdots\ D_{11} & \ddots & \vdots & \vdots & \vdots & \vdots\ D_{12} & \ddots & \vdots \\ 1 & \omega^{N-K-1} & \omega^{(N-K-1)2} & \cdots & \omega^{(N-K-1)(K-1)} & \omega^{(N-K-1)K} & \omega^{(N-K-1)(K+1)} & \omega^{(N-K-1)(K+2)} & \cdots & \omega^{(N-K-1)(N-1)} \\ 1 & \omega^{N-K} & \omega^{(N-K)2} & \cdots & \omega^{(N-K)(K-1)} & \omega^{(N-K)K} & \omega^{(N-K)(K+1)} & \omega^{(N-K)(K+2)} & \cdots & \omega^{(N-K)(N-1)} \\ 1 & \omega^{N-K+1} & \omega^{(N-K+1)2} & \cdots & \omega^{(N-K-1)(K-1)} & \omega^{(N-K+1)K} & \omega^{(N-K+1)(K+1)} & \omega^{(N-K+1)(K+2)} & \cdots & \omega^{(N-K+1)(N-1)} \\ 1 & \omega^{N-K+2} & \omega^{(N-K+2)2} & \cdots & \omega^{(N-K-2)(K-1)} & \omega^{(N-K+2)K} & \omega^{(N-K+2)(K+1)} & \omega^{(N-K+2)(K+2)} & \cdots & \omega^{(N-K+2)(N-1)} \\ \vdots & \vdots & \vdots\ D_{21} & \ddots & \vdots & \vdots & \vdots & \vdots\ D_{22} & \ddots & \vdots \\ 1 & \omega^{N-1} & \omega^{(N-1)2} & \cdots & \omega^{(N-1)(K-1)} & \omega^{(N-1)K} & \omega^{(N-1)(K+1)} & \omega^{(N-1)(K+2)} & \cdots & \omega^{(N-1)(N-1)} \end{bmatrix}$$

FIG.5

APPARATUS AND METHOD FOR SYNCHRONIZATION ACQUISITION AND CELL ID SEARCH IN WIRELESS COMMUNICATION SYSTEM

CROSS-REFERENCE TO RELATED APPLICATION(S) AND CLAIM OF PRIORITY

The present application claims priority under 35 U.S.C. §119 to an application filed in the Korean Intellectual Property Office on Jul. 25, 2008 and assigned Serial No. 10-2008-0072731, the contents of which are incorporated herein by reference.

TECHNICAL FIELD OF THE INVENTION

The present invention relates generally to an apparatus and method for synchronization acquisition and cell ID search in a wireless communication system, and in particular, to an apparatus and method for allocating a synchronization acquisition sequence in a time domain and allocating a cell ID search sequence in a frequency domain when using an Orthogonal Frequency Division Multiplexing (OFDM) symbol for synchronization acquisition and cell ID search in an OFDM system.

BACKGROUND OF THE INVENTION

In general, a wireless communication system provides a wireless communication service and includes Base Stations (BSs) and user terminals (or Mobile Stations (MSs)). The BS and the MS performs wireless communication by using transmission frames. Thus, the BS and the MS must acquire mutual synchronization and must search a cell ID for transmission/reception of the transmission frames. For the synchronization acquisition and the cell ID search, the BS transmits a synchronization signal so that the MS can detect the start of a frame transmitted from the BS. To this end, the BS performs an Inverse Fast Fourier Transform (IFFT) operation on a frequency-domain binary preamble sequence to transform it into a time-domain complex preamble sequence, and transmits the time-domain complex preamble sequence to the MS. The MS receives a synchronization signal of a complex preamble sequence from the BS to detect the frame timing of the BS, and demodulates a received frame according to the detected frame timing. In general, the synchronization signal uses a specific preamble sequence predefined between the BS and the MS.

An OFDM system allocates an OFDM symbol for synchronization acquisition and cell ID search. Using the OFDM symbol, the synchronization acquisition and the cell ID search may be performed by the following two methods.

In the first method, a BS allocates a sequence only to the even-numbered subcarrier in a frequency domain, performs an IFFT operation, generates a repetition structure in a time domain, and transmits the same to an MS. The MS acquires synchronization by using the time-domain repetition structure, acquires a frequency-domain sequence through a Fast Fourier Transform (FFT) operation, and searches a cell ID by using the frequency-domain sequence. The first method is low in complexity because it acquires synchronization by using the repetition structure. However, the first method is poor in performance because it uses a small length of sequence for synchronization acquisition.

In the second method, without using the repetition structure, a BS allocates sequences to all subcarriers in a frequency domain, wherein a synchronization acquisition sequence and a cell ID search sequence are allocated to subcarriers in a division manner. The second method may perform cell ID search and synchronization acquisition through various decoding schemes. One of the decoding schemes extracts a synchronization acquisition sequence by means of a band-pass filter, acquires synchronization in a time domain by means of the synchronization acquisition sequence, acquires a cell ID search sequence through an FFT operation, and searches a cell ID in a frequency domain by means of the cell ID search sequence. Another of the decoding schemes performs an FFT operation on a received sequence at each time to acquire synchronization in a frequency domain and search a cell ID in a frequency domain. The second method is good in performance but is high in complexity.

What is therefore required is a new sequence allocation method for synchronization acquisition and cell ID search in a wireless communication system, which can overcome the limitations of the first method and the second method.

SUMMARY OF THE INVENTION

To address the above-discussed deficiencies of the prior art, it is a primary aspect of the present invention is to substantially solve at least the above problems and/or disadvantages and to provide at least the advantages below. Accordingly, an object of the present invention is to provide an apparatus and method for synchronization acquisition and cell ID search in a wireless communication system.

Another object of the present invention is to provide an apparatus and method for allocating a synchronization acquisition sequence in a time domain and allocating a cell ID search sequence in a frequency domain when using an OFDM symbol for synchronization acquisition and cell ID search in an OFDM system.

Another object of the present invention is to provide an apparatus and method for reducing complexity and improving performance in synchronization acquisition and cell ID search when using an OFDM symbol for synchronization acquisition and cell ID search in an OFDM system.

According to an aspect of the present invention, a method for transmitting a synchronization signal of a base station (BS) in a wireless communication system includes: using a binary frequency-domain preamble sequence predetermined for cell ID search and a binary time-domain preamble sequence predetermined for synchronization acquisition, to determine a complex time-domain preamble sequence except the binary time-domain preamble sequence among the time-domain preamble sequences that are generated according to an IFFT operation on the binary frequency-domain preamble sequence; and transmitting the complex time-domain preamble sequence and the binary time-domain preamble sequence to an MS.

According to another aspect of the present invention, a method for acquiring the synchronization and cell ID of an MS in a wireless communication system includes: receiving a signal and extracting a portion of the received signal that has the same size as a binary time-domain preamble sequence predetermined for synchronization acquisition; performing a correlation operation on the portion of the received signal and the binary time-domain preamble sequence predetermined for synchronization acquisition; detecting a peak value of the correlation operation result to acquire synchronization; performing a FFT operation on a preamble sequence with an FFT size from the peak value detection point to transform the preamble sequence into a frequency-domain preamble sequence; extracting a portion of the frequency-domain preamble sequence that has the same size as a binary frequency-domain preamble sequence predetermined for cell ID search; performing a correlation operation on the portion of the frequency-domain preamble sequence and the binary frequency-domain preamble sequence predetermined for cell ID search; and detecting a peak value of the correlation operation result on the binary frequency-domain preamble sequence to acquire a cell ID.

According to another aspect of the present invention, an apparatus for transmitting a synchronization signal of a BS in a wireless communication system includes: an IFFT operator using a binary frequency-domain preamble sequence predetermined for cell ID search and a binary time-domain preamble sequence predetermined for synchronization acquisition, to determine a complex time-domain preamble sequence except the binary time-domain preamble sequence among the time-domain preamble sequences that are generated according to an IFFT operation on the binary frequency-domain preamble sequence; and a Radio Frequency (RF) transmitter transmitting the complex time-domain preamble sequence and the binary time-domain preamble sequence to an MS.

According to another aspect of the present invention, an apparatus for acquiring the synchronization and cell ID of an MS in a wireless communication system includes: an RF receiver receiving a signal; a synchronization acquirer extracting a portion of the received signal that has the same size as a binary time-domain preamble sequence predetermined for synchronization acquisition, performing a correlation operation on the portion of the received signal and the binary time-domain preamble sequence predetermined for synchronization acquisition, and detecting a peak value of the correlation operation result to acquire synchronization; an FFT operator performing an FFT operation on a preamble sequence with an FFT size from the peak value detection point to transform the preamble sequence into a frequency-domain preamble sequence; and a cell ID acquirer extracting apportion of the frequency-domain preamble sequence that has the same size as a binary frequency-domain preamble sequence predetermined for cell ID search, performing a correlation operation on the portion of the frequency-domain preamble sequence and the binary frequency-domain preamble sequence predetermined for cell ID search, and detecting a peak value of the correlation operation result on the binary frequency-domain preamble sequence to acquire a cell ID.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates a diagram for an N×N DFT matrix D for transforming a time-domain sequence into a frequency-domain sequence.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system The present invention provides an apparatus and method for synchronization acquisition and cell ID search in a wireless communication system. The following description is made in the context of an OFDM system, to which the present invention is not limited. Thus, it should be clearly understood that the present invention is also applicable to any other system requiring synchronization acquisition and cell ID search.

Figure 1:
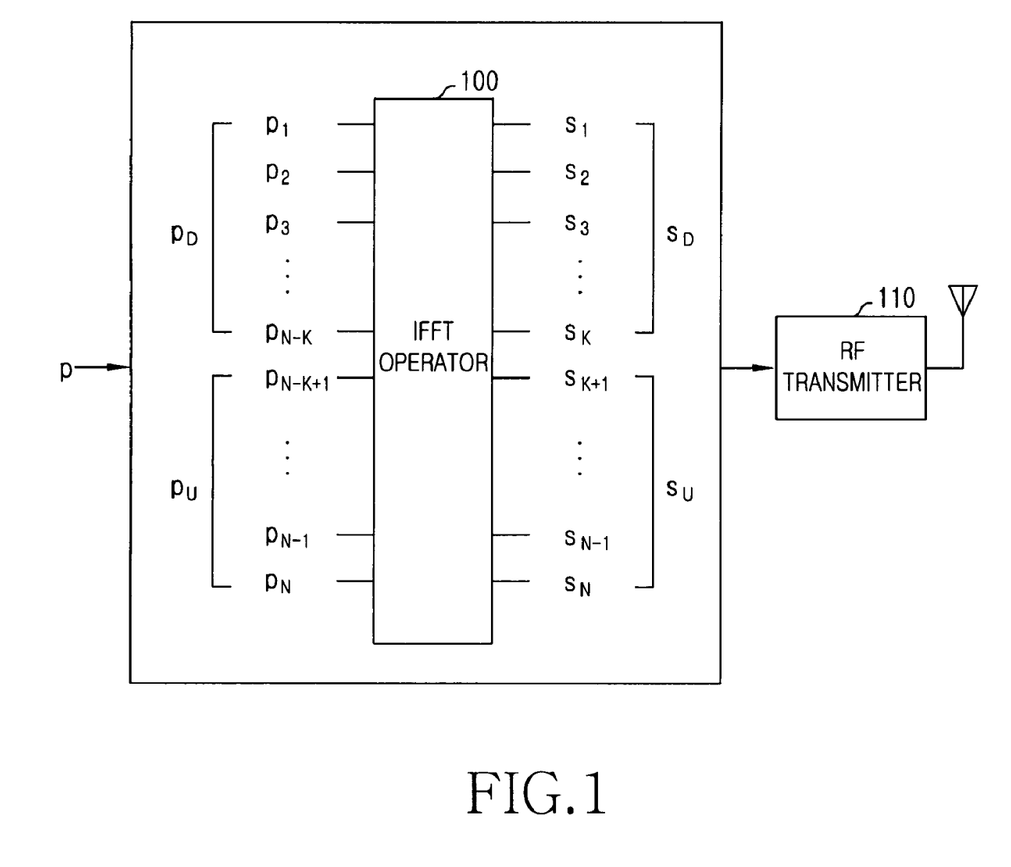
FIG. 1 illustrates a block diagram of a base station (BS) for synchronization acquisition and cell ID search in a wireless communication system according to an exemplary embodiment of the present invention.

FIG. 1 illustrates a block diagram of a base station (BS) for synchronization acquisition and cell ID search in a wireless communication system according to an exemplary embodiment of the present invention.

Referring to FIG. 1, the BS includes an Inverse Fast Fourier Transform (IFFT) operator 100 and a Radio Frequency (RF) transmitter 110.

First, the Fast Fourier Transform (FFT) size of the system according to an exemplary embodiment of the present invention is N. A frequency-domain sequence provided to the IFFT operator 100 is defined as $p=[p_D, p_U]$. The sequence length of $p_D$ is N−K, and the sequence length of $p_U$ is K. A time-domain sequence outputted from the IFFT operator 100 is defined as $s=[s_D, s_U]$. The sequence length of $s_D$ is K, and the sequence length of $s_U$ is N−K. The $p_D$ is a binary frequency-domain preamble sequence predetermined for cell ID search, and the $s_D$ is a binary time-domain preamble sequence predetermined for synchronization acquisition, wherein the BS and a MS share information about the two sequences. The $p_U$ and the $s_U$ are determined according to the input of the $p_D$ and the predetermined $s_D$ and are defined as a complex frequency-domain preamble sequence and a complex time-domain preamble sequence, respectively.

An N×N DFT (Discrete Fourier Transform) matrix D for transforming a time-domain sequence into a frequency-domain sequence in an OFDM system is expressed as Equation 1:

$$D = \frac{1}{\sqrt{N}} \begin{bmatrix} 1 & 1 & 1 & \cdots & 1 \\ 1 & \omega & \omega^2 & \cdots & \omega^{N-1} \\ 1 & \omega^2 & \omega^4 & \cdots & \omega^{2(N-1)} \\ \vdots & \vdots & \vdots & \ddots & \vdots \\ 1 & \omega^{N-1} & \omega^{2(N-1)} & \cdots & \omega^{(N-1)(N-1)} \end{bmatrix} \quad [\text{Eqn. 1}]$$

Herein, $\omega = \exp(-j*2\pi/N)$.

Using the DFT matrix of Equation 1, the relation between the frequency-domain sequence p and the time-domain sequence s is expressed as Equation 2:

$$p = \begin{bmatrix} p_D \\ p_U \end{bmatrix} \quad [\text{Eqn. 2}]$$

$$= \begin{bmatrix} D_{11} & D_{12} \\ D_{21} & D_{22} \end{bmatrix} \begin{bmatrix} s_D \\ s_U \end{bmatrix}$$

$$= \begin{bmatrix} D_{11}s_D + D_{12}s_U \\ D_{21}s_D + D_{22}s_U \end{bmatrix}.$$

The size of $D_{11}$ is (N−K)×K, the size of $D_{12}$ is (N−K)×(N−K), the size of $D_{21}$ is K×K, and the size of $D_{22}$ is K×(N−K). Equation 1 can be expressed in detail for $D_{11}$, $D_{12}$, $D_{21}$ and $D_{22}$ as illustrated in FIG. 5. In Equation 2, $p_D = D_{11}s_D + D_{12}s_U$, and the inverse matrix of $D_{12}$ always exists according to a Vandermonde matrix. Therefore, $s_U$ can be determined from $s_U = (D_{12})^{-1}(p_D - D_{11}s_D)$.

Whether the inverse matrix of $D_{12}$ always exists can be seen as follows.

First, the Vandermonde matrix V is defined as Equation 3:

$$\begin{bmatrix} 1 & \alpha_1 & \alpha_1^2 & \cdots & \alpha_1^{n-1} \\ 1 & \alpha_2 & \alpha_2^2 & \cdots & \alpha_2^{n-1} \\ 1 & \alpha_3 & \alpha_3^2 & \cdots & \alpha_3^{n-1} \\ \vdots & \vdots & \vdots & \ddots & \vdots \\ 1 & \alpha_m & \alpha_m^2 & \cdots & \alpha_m^{n-1} \end{bmatrix}. \quad [\text{Eqn. 3}]$$

W m=n, a determinant det(V) of the Vandermonde matrix is $$\det(V) = \prod_{1 \le i < j \le n} (\alpha_j - \alpha_i).$$

Thus, when m=n, the inverse matrix of the Vandermonde matrix always exits. When m=n=N−K substituting $\alpha_1 = \omega^K$, $\alpha_1 = \omega^{K+1}, \ldots, \alpha_{N-K} = \omega^{N-1}$ in the Vandermonde matrix of Equation 3 results in the transpose matrix of $D_{12}$. Thus, it can be seen that the inverse matrix of $D_{12}$ also exists always.

Referring to FIG. 1, the IFFT operator 100 receives a binary frequency-domain preamble sequence $p_D$ predetermined for cell ID search. Using the binary frequency-domain preamble sequence $p_D$ and a binary time-domain preamble sequence $s_D$ predetermined for synchronization acquisition, the IFFT operator 100 determines a complex time-domain preamble sequence $s_U$ except the binary time-domain preamble sequence $s_D$ among the time-domain preamble sequences that may be generated according to an IFFT operation on the binary frequency-domain preamble sequence $p_D$. Accordingly, a complex frequency-domain preamble sequence $p_U$ is also determined. Thereafter, the IFFT operator 100 outputs the complex time-domain preamble sequence $s_U$ and the binary time-domain preamble sequence $s_D$. That is, using the binary frequency-domain preamble sequence $p_D$, the binary time-domain preamble sequence $s_D$, the complex frequency-domain preamble sequence $p_U$, and the complex time-domain preamble sequence $s_U$ determined according to the two sequences $p_D$ and $s_D$, the IFFT operator 100 performs an IFFT operation on a frequency-domain preamble sequence p including the binary frequency-domain preamble sequence $p_D$ and the complex frequency-domain preamble sequence $p_U$ to output a time-domain preamble sequence s including the binary time-domain preamble sequence $s_D$ and the complex time-domain preamble sequence $s_U$.

The RF transmitter 110 receives the complex time-domain preamble sequence $s_U$ and the binary time-domain preamble sequence $s_D$ from the IFFT operator 100 and transmits the received sequences $s_U$ and $s_D$ to the MS through an antenna.

Figure 2:
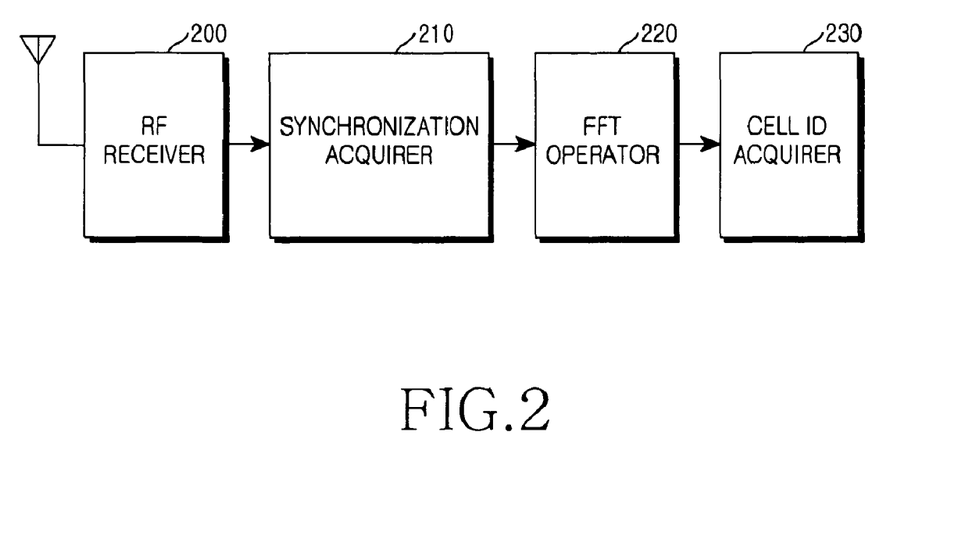
FIG. 2 illustrates a block diagram of a mobile station (MS) for synchronization acquisition and cell ID search in a wireless communication system according to an exemplary embodiment of the present invention.

FIG. 2 illustrates a block diagram of the MS for synchronization acquisition and cell ID search in a wireless communication system according to an exemplary embodiment of the present invention.

Referring to FIG. 2, the MS includes an RF receiver 200, a synchronization acquirer 210, an FFT operator 220, and a cell ID acquirer 230.

The RF receiver 200 receives a signal from the BS through an antenna and outputs the same.

The synchronization acquirer 210 performs a correlation operation on a portion of the received signal provided from the RF receiver 200 and a binary time-domain preamble sequence $s_D$ predetermined for synchronization acquisition, and detects a peak value of the correlation operation result to acquire synchronization. Also, the synchronization acquirer 210 outputs a preamble sequence of an FFT size from the peak value detection point. The portion of the received signal has the same size as the binary time-domain preamble sequence predetermined for synchronization acquisition.

The FFT operator 220 performs an FFT operation on the preamble sequence with an FFT size from the peak value detection point, provided from the synchronization acquirer 210, to transform the preamble sequence into a frequency-domain preamble sequence.

The cell ID acquirer 230 performs a correlation operation on a portion of the frequency-domain preamble sequence provided from the FFT operator 220 and a binary frequency-domain preamble sequence $p_D$ predetermined for cell ID search, and detects a peak value of the correlation operation result to acquire a cell ID. The portion of the frequency-domain preamble sequence has the same size as the binary frequency-domain preamble sequence predetermined for cell ID search.

Figure 3:
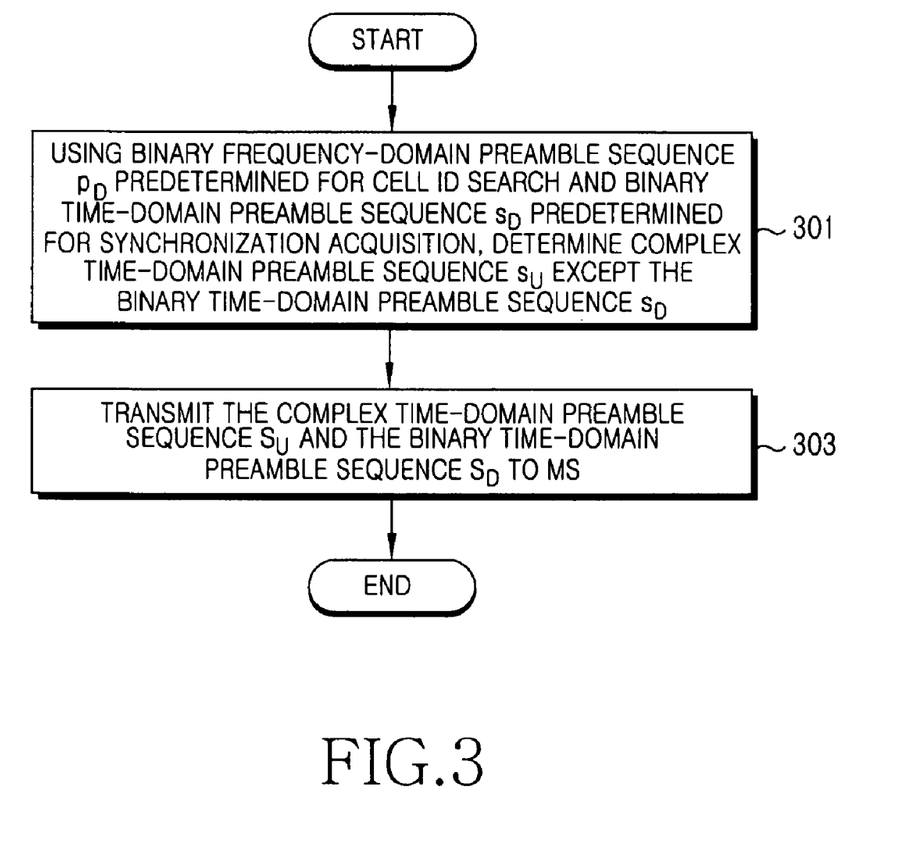
FIG. 3 illustrates a flow chart for a process for transmitting a synchronization signal of the BS for synchronization acquisition and cell ID search in a wireless communication system according to an exemplary embodiment of the present invention.

FIG. 3 illustrates a flow chart for a process for transmitting a synchronization signal of the BS for synchronization acquisition and cell ID search in a wireless communication system according to an exemplary embodiment of the present invention.

Referring to FIG. 3, in step 301, using a binary frequency-domain preamble sequence $p_D$ predetermined for cell ID search and a binary time-domain preamble sequence $s_D$ predetermined for synchronization acquisition, the BS determines a complex time-domain preamble sequence $s_U$ except the binary time-domain preamble sequence $s_D$ among the time-domain preamble sequences that may be generated according to an IFFT operation on the binary frequency-domain preamble sequence $p_D$.

In step 303, the BS transmits the complex time-domain preamble sequence $s_U$ and the binary time-domain preamble sequence $s_D$ to the MS.

Thereafter, the BS ends the process according to the present invention.

Figure 4:
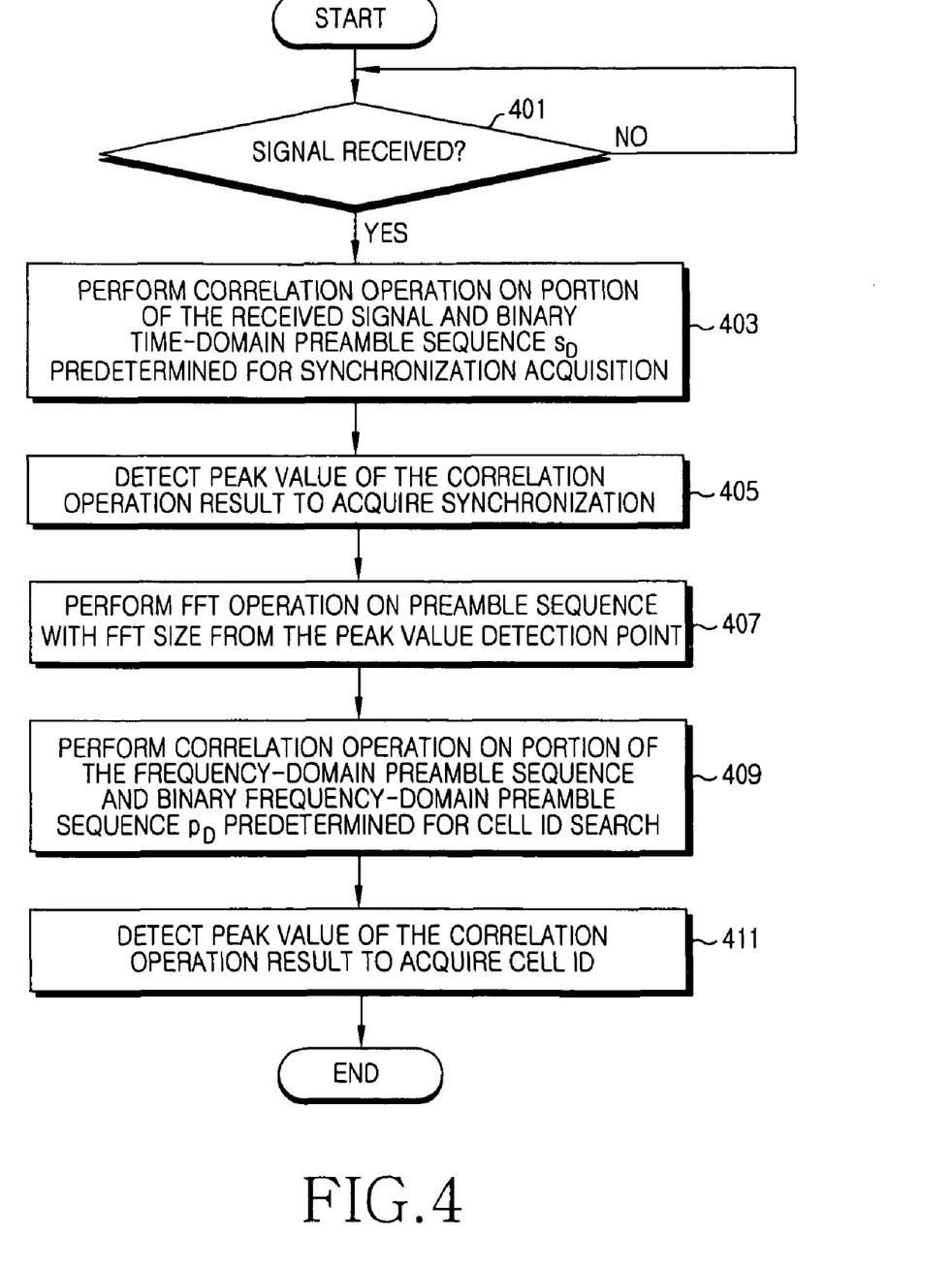
FIG. 4 illustrates a flow chart for a process for acquiring the synchronization and cell ID of the MS by means of a synchronization signal received from a BS in a wireless communication system according to an exemplary embodiment of the present invention.

FIG. 4 illustrates a flow chart for a process for acquiring the synchronization and cell ID of the MS by means of a synchronization signal received from the BS in a wireless communication system according to an exemplary embodiment of the present invention.

Referring to FIG. 4, the MS is turned on and determines whether a signal is received from the BS, in step 401.

If the signal is received, the process proceeds to step 403. In step 403, the MS performs a correlation operation on a portion of the received signal and a binary time-domain preamble sequence SD predetermined for synchronization acquisition. In step 405, the MS detects a peak value of the correlation operation result to acquire synchronization. The portion of the received signal has the same size as the binary time-domain preamble sequence predetermined for synchronization acquisition.

In step 407, the MS performs an FFT operation on a preamble sequence with an FFT size from the peak value detection point to transform the preamble sequence into a frequency-domain preamble sequence.

In step 409, the MS performs a correlation operation on a portion of the frequency-domain preamble sequence and a binary frequency-domain preamble sequence $p_D$ predetermined for cell ID search. In step 411, the MS detects a peak value of the correlation operation result to acquire a cell ID. The portion of the frequency-domain preamble sequence has the same size as the binary frequency-domain preamble sequence predetermined for cell ID search.

Thereafter, the MS ends the process according to the present invention.

As described above, when using an OFDM symbol for synchronization acquisition and cell ID search in an OFDM system, the present invention allocates a synchronization acquisition sequence in a time domain and allocates a cell ID search sequence in a frequency domain, thereby making it possible to design a preamble having low complexity and good performance. Because the conventional method uses a complex preamble sequence for synchronization acquisition and cell ID acquisition, it requires high complexity due to a multiplication operation. The present invention, however, uses the binary preamble sequences for synchronization acquisition and cell ID acquisition, thus making it possible to greatly reduce the complexity through the simple addition operation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a synchronization signal of a base station (BS) in a wireless communication system, the method comprising:

using a binary frequency-domain preamble sequence predetermined for cell ID search and a binary time-domain preamble sequence predetermined for synchronization acquisition to determine a complex time-domain preamble sequence according to an Inverse Fast Fourier Transform (IFFT) operation on the binary frequency-domain preamble sequence; and transmitting the complex time-domain preamble sequence and the binary time-domain preamble sequence to a mobile station (MS).

2. The method of claim 1, wherein the synchronization acquisition and the cell ID search are performed using an Orthogonal Frequency Division Multiplexing (OFDM) symbol.

3. The method of claim 1, wherein the input value of the IFFT operation includes the binary frequency-domain preamble sequence and the complex frequency-domain preamble sequence used to generate the binary time-domain preamble sequence and the complex time-domain preamble sequence according to the IFFT operation.

4. The method of claim 1, wherein the complex time-domain preamble sequence is determined except the binary time-domain preamble sequence among the time-domain preamble sequences that are generated.

5. The method of claim 1, wherein using comprises determining the complex time-domain preamble sequence based on a first equation defined as:

$$s_U = (D_{12})^{-1}(p_D - D_{11}s_D)$$

Where $s_U$ is the complex time-domain preamble sequence, $D_{12}$ is a (1, 2) element of a discrete Fourier transform matrix D defining the relationship between a frequency-domain sequence and time-domain sequence, $p_D$ is a binary frequency-domain preamble sequence, $D_{11}$ is a (1, 1) element of a discrete Fourier transform matrix D defining the relationship between a frequency-domain sequence and time-domain sequence, and $s_D$ is a binary time-domain preamble sequence.

6. The method of claim 5, wherein D is defined based on a second equation defined as:

$$D = \frac{1}{\sqrt{N}} \begin{bmatrix} 1 & 1 & 1 & K & 1 \\ 1 & \omega & \omega^2 & K & \omega^{N-1} \\ 1 & \omega^2 & \omega^4 & K & \omega^{2(N-1)} \\ M & M & M & O & M \\ 1 & \omega^{N-1} & \omega^{2(N-1)} & K & \omega^{(N-1)(N-1)} \end{bmatrix}.$$

7. The method of claim 6, wherein p is based on a third equation defined as:

$$p = \begin{bmatrix} p_D \\ p_U \end{bmatrix}$$
$$= \begin{bmatrix} D_{11} & D_{12} \\ D_{21} & D_{22} \end{bmatrix} \begin{bmatrix} s_D \\ s_U \end{bmatrix}$$
$$= \begin{bmatrix} D_{11}s_D + D_{12}s_U \\ D_{21}s_D + D_{22}s_U \end{bmatrix}.$$

8. A method for acquiring the synchronization and cell ID of a mobile station (MS) in a wireless communication system, comprising:

receiving a signal and extracting a portion of the received signal, performing a correlation operation on the portion of the received signal and a binary time-domain preamble sequence predetermined for synchronization acquisition;

detecting a peak value of the correlation operation result to acquire synchronization;

performing a Fast Fourier Transform (FFT) operation on a preamble sequence with an FFT size from the peak value detection point to transform the preamble sequence into a frequency-domain preamble sequence;

extracting a portion of the frequency-domain preamble sequence, performing a correlation operation on the portion of the frequency-domain preamble sequence and the binary frequency-domain preamble sequence predetermined for cell ID search; and detecting a peak value of the correlation operation result on the binary frequency-domain preamble sequence to acquire a cell ID.

9. The method of claim 8, wherein the synchronization acquisition and the cell ID search are performed using an Orthogonal Frequency Division Multiplexing (OFDM) symbol.

10. The method of claim 8, wherein the received signal has a size equal to a size of the binary time-domain preamble sequence predetermined for synchronization acquisition.

11. The method of claim 8, wherein the extracted portion of the frequency-domain preamble sequence has a size equal to a size of a binary frequency-domain preamble sequence predetermined for cell ID search.

12. An apparatus for transmitting a synchronization signal of a base station (BS) in a wireless communication system, the apparatus comprising:

an Inverse Fast Fourier Transform (IFFT) operator using a binary frequency-domain preamble sequence predetermined for cell ID search and a binary time-domain preamble sequence predetermined for synchronization acquisition, to determine a complex time-domain preamble sequence according to an IFFT operation on the binary frequency-domain preamble sequence; and a Radio Frequency (RF) transmitter transmitting the complex time-domain preamble sequence and the binary time-domain preamble sequence to a mobile station (MS).

13. The apparatus of claim 12, wherein the synchronization acquisition and the cell ID search are performed using an Orthogonal Frequency Division Multiplexing (OFDM) symbol.

14. The apparatus of claim 12, wherein the input value of the IFFT operation includes the binary frequency-domain preamble sequence and the complex frequency-domain preamble sequence used to generate the binary time-domain preamble sequence and the complex time-domain preamble sequence according to the IFFT operation.

15. The apparatus of claim 12, wherein the complex time-domain preamble sequence is determined except the binary time-domain preamble sequence among the time-domain preamble sequences that are generated.

16. The apparatus of claim 12, wherein using comprises determining the complex time-domain preamble sequence based on a first equation defined as:

$$s_U = (D_{12})^{-1}(p_D - D_{11}s_D)$$

Where $s_U$ is the complex time-domain preamble sequence, $D_{12}$ is a (1, 2) element of a discrete Fourier transform matrix D defining the relationship between a frequency-domain sequence and time-domain sequence, $p_D$ is a binary frequency-domain preamble sequence, $D_{11}$ is a (1, 1) element of a discrete Fourier transform matrix D defining the relationship between a frequency-domain sequence and time-domain sequence, and $s_D$ is a binary time-domain preamble sequence.

17. The apparatus of claim 16, wherein D is defined based on a second equation defined as:

$$D = \frac{1}{\sqrt{N}} \begin{bmatrix} 1 & 1 & 1 & K & 1 \\ 1 & \omega & \omega^2 & K & \omega^{N-1} \\ 1 & \omega^2 & \omega^4 & K & \omega^{2(N-1)} \\ M & M & M & O & M \\ 1 & \omega^{N-1} & \omega^{2(N-1)} & K & \omega^{(N-1)(N-1)} \end{bmatrix}.$$

18. The apparatus of claim 17, wherein p is based on a third equation defined as:

$$p = \begin{bmatrix} p_D \\ p_U \end{bmatrix}$$
$$= \begin{bmatrix} D_{11} & D_{12} \\ D_{21} & D_{22} \end{bmatrix} \begin{bmatrix} s_D \\ s_U \end{bmatrix}$$
$$= \begin{bmatrix} D_{11}s_D + D_{12}s_U \\ D_{21}s_D + D_{22}s_U \end{bmatrix}.$$

19. An apparatus for acquiring the synchronization and cell ID of a mobile station (MS) in a wireless communication system, comprising:

a Radio Frequency (RF) receiver receiving a signal;

a synchronization acquirer extracting a portion of the received signal, which has the same size as a binary time-domain preamble sequence predetermined for synchronization acquisition, performing a correlation operation on the portion of the received signal and the binary time-domain preamble sequence predetermined for synchronization acquisition, and detecting a peak value of the correlation operation result to acquire synchronization;

a Fast Fourier Transform (FFT) operator performing an FFT operation on a preamble sequence with an FFT size from the peak value detection point to transform the preamble sequence into a frequency-domain preamble sequence; and a cell ID acquirer extracting a portion of the frequency-domain preamble sequence, which has the same size as a binary frequency-domain preamble sequence predetermined for cell ID search, performing a correlation operation on the portion of the frequency-domain preamble sequence and the binary frequency-domain preamble sequence predetermined for cell ID search, and detecting a peak value of the correlation operation result on the binary frequency-domain preamble sequence to acquire a cell ID.

20. The apparatus of claim 19, wherein the synchronization acquisition and the cell ID search are performed using an Orthogonal Frequency Division Multiplexing (OFDM) symbol.

* * * * *